June 9, 1931.  E. S. COLE  1,809,376
ORIFICE FOR FLOW MEASURING SYSTEMS
Filed April 11, 1924
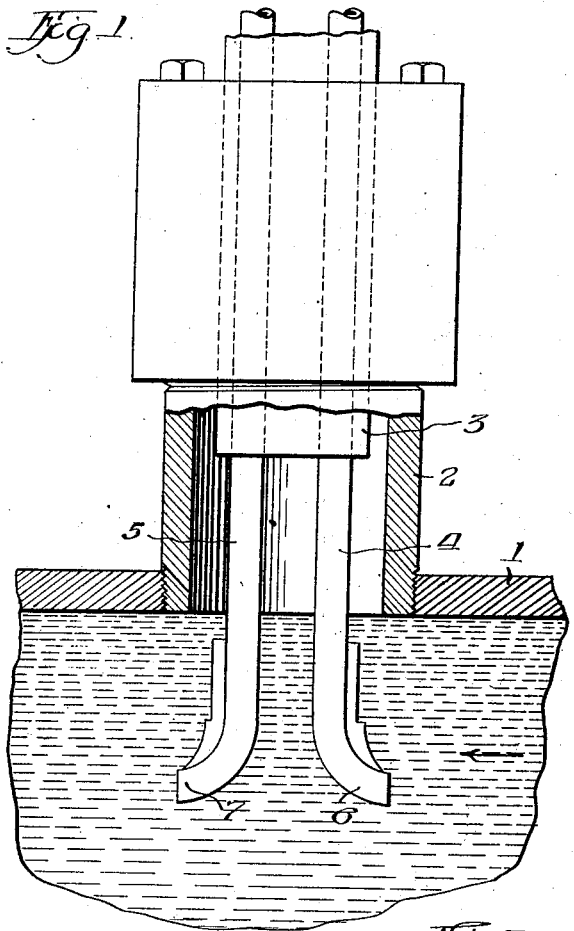
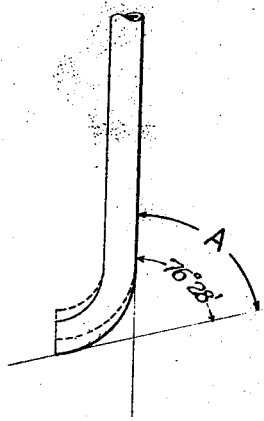
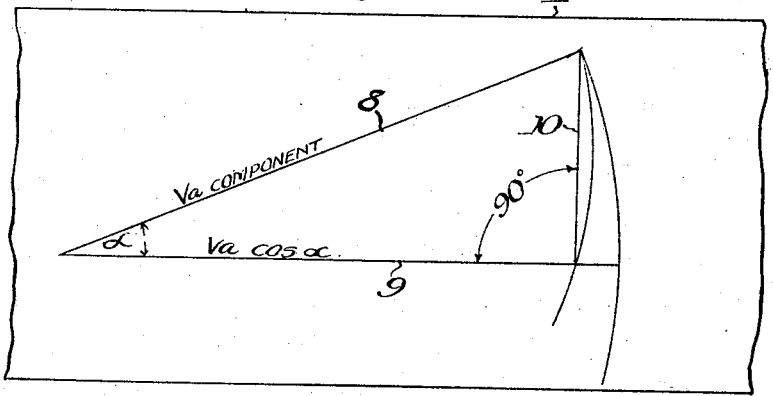
Inventor
Edward S. Cole Patented June 9, 1931

1,809,376

UNITED STATES PATENT OFFICE

EDWARD S. COLE, OF NEW YORK, N. Y.

ORIFICE FOR FLOW MEASURING SYSTEMS

Application filed April 11, 1924. Serial No. 705,811.

My invention relates to systems for measuring, and if desired, for indicating and recording the flow of flowing streams, and it relates in particular to the orifices which are extensively used in these systems, such orifices being inserted or projected in the pipe or conduit containing the flowing stream whose flow is to be measured.

In flow measuring sytems of this character it has been found that error will result if the orifices are not aligned with the pipe or conduit containing the flowing stream, or if the stream flows by the orifices at an angle. In both of these instances the measuring instruments will overread, thereby giving an apparent flow greater than the actual flow.

The error from angularity on the part of the instrument may be readily corrected by exerting care in setting the instrument, so that the orifices will be strictly in axial alinement with the pipe or conduit, and not at an angle therewith. But the correction of the error due to an angular flow past the orifices in the pipe or conduit is a different matter, and heretofore, prior to my invention, so far as I know, has not been corrected.

In accordance with my invention I correct this overreading due to angularity of flow by means of the orifice or orifices used in the flowing stream, devising and constructing an orifice which will automatically and of itself give the desired axial component of the angular flow, so that the measuring instrument will read such axial component and not the angular flow itself, and consequently the measuring instrument will be accurate, giving the desired axial flow of the stream in the pipe or conduit.

Referring to the drawings, Fig. 1 is an elevation partly in section of a portion of a pipe or conduit containing a flowing stream to be measured and a portion of a rod meter or pitometer connection arranged in connection with the pipe or conduit and having orifices embodying my invention;

Fig. 2 is a view showing an orifice embodying my invention and also a type of orifice commonly used prior to the invention;

Fig. 3 is a diagrammatic view to illustrate the invention.

Referring to the drawings, I show a pipe or conduit 1 and a branch pipe 2 containing a rod meter 3 from whose lower end project pipe sections 4 and 5 having orifices 6 and 7, respectively. Orifice 6 faces upstream and orifice 7 downstream, whereby these two orifices receive dynamic and static pressure.

It will be understood that pipes 4 and 5 are connected with suitable measuring instruments for measuring, indicating and recording the velocity flow as may be desired, and as are well known in the art.

These orifices 6 and 7 embody my invention and are of such character that when facing upstream they will read only the axial components of the angular velocities and will not read those angular velocities themselves. Thus these orifices are "self correcting" for angular flows and the error previously spoken of heretofore present in systems of this kind may now be corrected.

By actual test I find orifices of the character shown will be thus self correcting for all angular flows up to above 10 degrees on either side of the axis of the pipe or conduit.

These self correcting orifices have the curved ends indicated in the drawings and particularly in Figs. 1 and 2, which curved ends are somewhat straighter by about 3/32 of an inch, than the curved ends of orifices heretofore used in work of this character for example those of my prior Patent (joint) No 817,470 of April 10, 1906. For instance, in Fig. 2 the orifice of the present invention is shown in full lines and an orifice commonly used a great deal in this work is shown in dotted lines, but said orifice of the dotted lines did not always give correct readings, but gave readings which were erroneous for angular flows, as above stated. The angle A formed by the tangent to the tip of the tube providing the orifice with the vertical is about 76°, 28′.

In Fig. 3 I show in diagram the pipe 1, and a right triangle formed by lines 8, 9 and 10, whereof the line 8 indicates the direction of angular flow in the pipe, the line 9 the axial component of the flow and the angle $\alpha$ between the lines 8 and 9, being the angle of the angular flow. Thus the orifice of my invention for an angular flow indicated by 8 making the angle α with the axis of the pipe or conduit will indicate or read the axial component 9, being the angular flow 8 multiplied by the cosine of angle α. This I find by very extensive tests to be the case, the orifices yielding this result with either orifice facing up stream and parallel to the pipe axis.

It will be understood that changes and modifications may be made without departing from the spirit of the invention.

What I claim is:

1. A rod-meter for flow-measuring systems having an orificed inlet end of such inclination to the vertical that it will cause an indication of the axial components of angular flows.

2. A rod-meter for flow-measuring systems, having an inlet end, said inlet end being of such inclination to the vertical as to cause an indication which is the product of the angular flow multiplied by the cosine of the angle of deflection of said angular flows with the pipe axis.

3. A rod-meter for flow measuring systems, having its inlet end arranged at such curvature as to cause indications which are the axial components of the velocities of angular flows.

4. A rod-meter for flow-measuring systems, having its inlet end provided with a curvature arranged to cause indications which are the angular velocities multiplied by the cosine of the angle of said angular flows.

5. A rod-meter for flow-measuring systems, having its inlet end provided with a curvature, the tangent at the tip of said inlet end forming an angle with the vertical of approximately 76 degrees, 28 minutes (76°, 28′).

In witness whereof, I hereunto subscribe my name this 11th day of March, A. D. 1924.

EDWARD S. COLE.